United States Patent
Wycech

(10) Patent No.: US 6,406,078 B1
(45) Date of Patent: Jun. 18, 2002

(54) COMPOSITE LAMINATE AUTOMOTIVE STRUCTURES

(75) Inventor: Joseph S. Wycech, Grosse Pointe Shores, MI (US)

(73) Assignee: Henkel Corporation, Gulph Mills, PA (US)

(*) Notice: Subject to any disclaimer, the term of this patent is extended or adjusted under 35 U.S.C. 154(b) by 0 days.

(21) Appl. No.: 09/517,780

(22) Filed: Mar. 2, 2000

Related U.S. Application Data

(63) Continuation-in-part of application No. 09/074,616, filed on May 7, 1998, which is a continuation-in-part of application No. 08/751,093, filed on Nov. 15, 1996, now Pat. No. 5,884,960, which is a continuation of application No. 08/245,798, filed on May 19, 1994, now Pat. No. 5,575,526.

(51) Int. Cl.⁷ .............................................. B60R 19/22

(52) U.S. Cl. ........................................ 293/120; 52/735.1

(58) Field of Search ........................... 296/146.6, 205, 296/157; 293/120–122; 52/731.6, 735.1, 309.9

(56) References Cited

U.S. PATENT DOCUMENTS

| | | | |
|---|---|---|---|
| 3,123,170 A | 3/1964 | Bryant et al. ............... 180/68.4 |
| 3,493,257 A | 2/1970 | Fitzgerald et al. ........... 293/120 |
| 3,815,307 A | 6/1974 | Tantlinger ................ 296/178 X |
| 3,883,168 A | * 5/1975 | Goupy et al. ................ 293/120 |
| 4,019,301 A | 4/1977 | Fox |
| 4,090,734 A | 5/1978 | Inami et al. .............. 296/146.6 |
| 4,238,540 A | 12/1980 | Yates ......................... 428/35.9 |
| 4,397,490 A | 8/1983 | Evans et al. ................ 293/120 |
| 4,559,274 A | 12/1985 | Kloppe et al. ............... 428/594 |
| 4,610,836 A | 9/1986 | Wycech ....................... 264/313 |
| 4,751,249 A | 6/1988 | Wycech ........................ 521/54 |
| 4,836,516 A | 6/1989 | Wycech ....................... 267/279 |
| 4,853,270 A | 8/1989 | Wycech ......................... 428/68 |
| 4,861,097 A | 8/1989 | Wycech ....................... 296/188 |
| 4,901,500 A | 2/1990 | Wycech ...................... 52/735.1 |
| 4,908,930 A | 3/1990 | Wycech ...................... 29/527.2 |
| 4,922,596 A | 5/1990 | Wycech ...................... 29/897.2 |

(List continued on next page.)

FOREIGN PATENT DOCUMENTS

| | | | | |
|---|---|---|---|---|
| DE | 2205327 | * | 8/1973 | ............... 293/109 |
| DE | 2752077 | * | 5/1978 | ............... 293/109 |
| DE | 2919046 | | 11/1980 | |
| DE | 9011147 | | 12/1990 | |
| DE | 9320333 | | 9/1994 | |
| EP | 0061131 | | 9/1982 | |
| EP | 0414302 | | 2/1991 | |
| EP | 0453777 | | 10/1991 | |
| EP | 595607 | * | 5/1994 | ............... 293/109 |
| EP | 1057718 | | 6/2000 | |
| GB | 628863 | | 9/1949 | |
| GB | 2061196 | | 5/1981 | |
| GB | 2197267 | | 5/1988 | |
| JP | 59543 | * | 4/1984 | ............... 293/120 |
| JP | 6469308 | | 3/1989 | |
| JP | 6469309 | | 3/1989 | |
| JP | 02206537 | | 8/1990 | |
| JP | 404024118 | * | 1/1992 | ............. 296/146.6 |
| JP | 7031569 | | 5/1995 | |
| WO | WO8701978 | | 4/1987 | |
| WO | WO8906595 | | 7/1989 | |
| WO | WO9305103 | | 3/1993 | |
| WO | WO9532110 | | 11/1995 | |

OTHER PUBLICATIONS

Novamax Sales Brochure.

*Primary Examiner*—Dennis H. Pedder
(74) *Attorney, Agent, or Firm*—Connolly Bove Lodge & Hutz, LLP

(57) ABSTRACT

A structural member having at least two non-coplanar surfaces is reinforced by providing a drop in insert between the surfaces. The insert is a carrier having an expandable structural foam intimately bonded to the carrier. When the foam is expanded, the foam becomes intimately bonded to the surfaces of the structural member to reinforce the structural member.

6 Claims, 6 Drawing Sheets

U.S. PATENT DOCUMENTS

| | | | |
|---|---|---|---|
| 4,923,902 A | 5/1990 | Wycech | 521/54 |
| 4,978,562 A | 12/1990 | Wycech | 486/35.8 |
| 4,995,545 A | 2/1991 | Wycech | 228/119 |
| 5,122,398 A * | 6/1992 | Seiler et al. | 293/120 X |
| 5,124,186 A | 6/1992 | Wycech | 428/35.8 |
| 5,128,191 A | 7/1992 | Lenz et al. | 428/116 |
| 5,194,199 A | 3/1993 | Thum | 264/46.6 |
| 5,209,541 A | 5/1993 | Janotik | 296/209 X |
| 5,213,391 A | 5/1993 | Takagi | 296/205 |
| 5,255,487 A | 10/1993 | Weiting et al. | 52/735.1 |
| 5,575,526 A | 11/1996 | Wycech | 296/205 |
| 5,884,960 A | 3/1999 | Wycech | 296/146.6 |
| 5,888,600 A * | 3/1999 | Wycech | 428/35.9 |
| 6,168,226 B1 | 1/2001 | Wycech | |

* cited by examiner

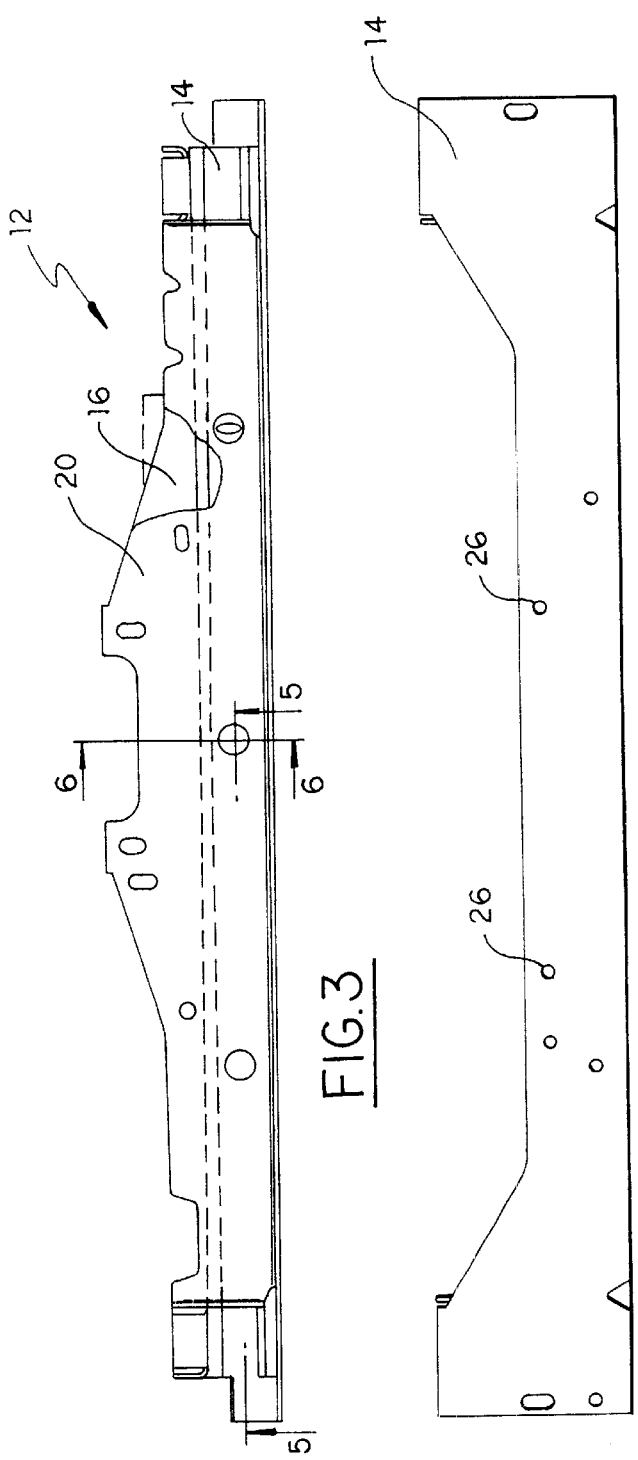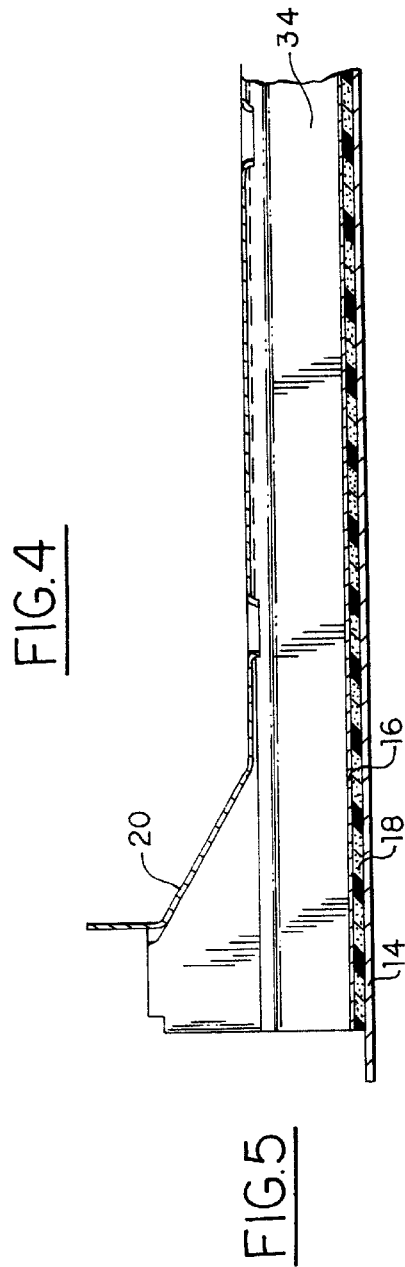

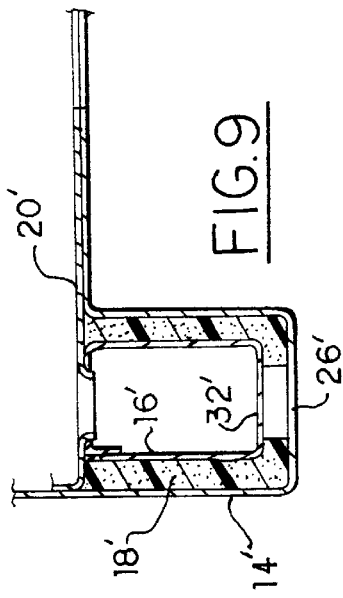
FIG.6
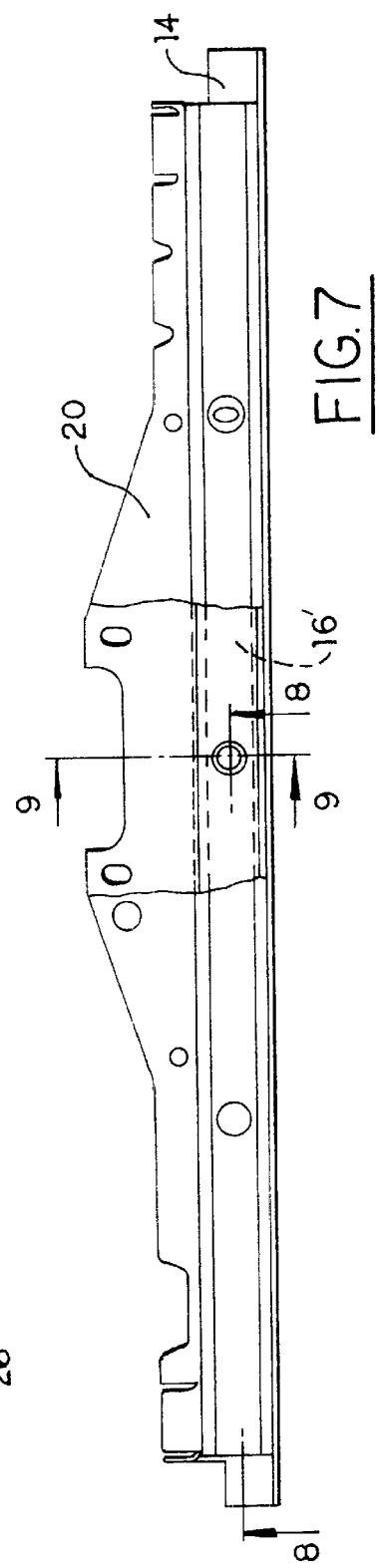
FIG.7
FIG.8
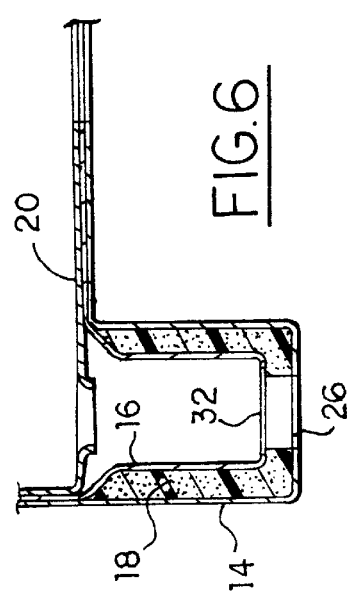
FIG.9

COMPOSITE LAMINATE AUTOMOTIVE STRUCTURES

CROSS REFERENCE TO RELATED APPLICATIONS

This application is a continuation in part of application Ser. No. 74,616 filed May 7, 1998, which in turn is a continuation in part of application Ser. No. 751,093 filed Nov. 15, 1996 now U.S. Pat. No. 5,884,960, which in turn is a continuation in part of application Ser. No. 245,798 filed May 19, 1994, now U.S. Pat. No. 5,575,526.

TECHNICAL FIELD

The present invention relates generally to automotive body structural members and, more specifically, relates to techniques for increasing strength and stiffness of automotive body structural members.

BACKGROUND OF THE INVENTION

In a number of applications, particularly in the automotive industry, it is important to provide high strength structural members at the lowest possible mass. A number of composite materials have been proposed by others in the past for use in forming structural members, including exotic lightweight alloys. In the automotive industry, however, the need for mass reduction without sacrificing strength must be balanced against the cost of the product to the consumer. Thus, there is a need for maintaining or increasing the strength of structural members such as rockers, windshield, pillars, radiator support beams, drive shafts, side impact beams, and bumpers without significantly increasing materials and labor costs.

The reinforcement of motor vehicle structural members through the use of composite materials is known. For example, the present inventor has disclosed a number of metal/plastic composite structures for use in reinforcing motor vehicles components. In U.S. Pat. No. 4,901,500, entitled "Lightweight Composite Beam," a reinforcing beam for a vehicle door is disclosed which comprises an open channel-shaped metal member having a longitudinal cavity which is filled with a thermoset or thermoplastic resin-based material. In U.S. Pat. No. 4,908,930 entitled, "Method of Making a Torsion Bar," a hollow torsion bar reinforced by a mixture of resin with filler is described. The tube is cut to length and charged with a resin-based material.

In U.S. Pat. No. 4,751,249, entitled, "Reinforcement Insert for a Structural Member with Method of Making and Using the Same", a precast reinforcement insert for structural members is provided which is formed of a plurality of pellets containing a thermoset resin with a blowing agent. The precast is expanded and cured in place in the 'structural member. In U.S. Pat. No. 4,978,562, entitled, "Composite Tubular Door Beam Reinforced with a Syntactic Foam Core Localized at the Mid Span of the Tube", a composite door beam is described which has a resin-based core that occupies not more than one-third of the bore of a metal tube.

In addition to the present inventor's own prior work, a number of metal laminates constructions are known in which flat metal plates are bonded together by an intervening layer of resin. It is also known to form a metal laminate sheet for use as a floor panel member which comprises, a pair of flat metal sheets having an intervening layer of asphalt or elastic polymer.

Although filling sections with plastic foam does significantly increase section stiffness (at least when high-density foams are utilized), they also increase mass and thus part weight, which, as stated, is an undesirable feature in automotive applications. Moreover, although increasing the metal gauge of a section or adding localized metal reinforcements will increase stiffness, as the metal thickness increases, it is more difficult to form the part due to limitations in metal forming machines. Importantly, in many applications increasing metal gauge will not work effectively because stiffness frequency is proportional to section stiffness divided by section mass:

f≈(i.e., frequency is proportional to the square root of stiffness over mass). Mass and stiffness are increased proportionately, with no resultant change in the dynamic stiffness frequency of the part.

In addition, filling a section entirely with foam creates a large heat sink and requires elaborate sealing operations to close access holes in the stampings. Also, the presence of the foam may interfere with the placement of interior trim panels, wiring harnesses, and hinges.

Accordingly, it would be desirable to provide a low-cost technique for increasing the stiffness of a section without proportionately increasing the mass. The present invention provides sections which have increased stiffness values with no significant increase in mass and without the use of high volumes of expensive resins. In many applications, the present invention reduces vibrations which cause unwanted "shake" of a component.

SUMMARY OF THE INVENTION

In one aspect, the present invention provides a hollow laminate beam characterized by its high-stiffness-to-mass ratio. The beam has an outer portion which is separated from an inner tube by a thin layer of structural foam. The cavity defined by the beam may be open or closed along its length.

In another aspect, the hollow laminate beam of the present invention is an automotive radiator support beam having an outer metal section and a generally rectangular inner tube, which may be open on one side. At least three sides of the rectangular inner tube are coated with a structural foam which is disposed between the rectangular inner tube and the outer metal section and in contact therewith. A metal cap is welded in place to complete the beam and retain the inner tube. The diameter of any through holes in the inner tube which are in alignment with through-holes in the outer portion are larger than the outer portion through-holes such that the structural foam does not block the through-hole clearances of either metal thicknesses.

In still another aspect, the laminate beam of the present invention is an automotive windshield pillar. A hollow metal tube is disposed within the pillar and is separated from the outer pillar stampings by a thin layer of structural foam.

In still another aspect, the laminate beam of the present invention is an automotive rocker panel assembly. The rocker panel assembly comprises mating inner and outer panel sections which form a generally rectangular rocker panel wall structure. Positioned within the rocker panel wall structure is a closely fitting inner metal tube which defines a cavity. A thin layer of structural foam is disposed between the rocker panel wall structure and the inner tube structure.

In still another aspect the beam is a motor vehicle drive shaft. An inner tube is closely received within the outer drive shaft housing, thereby defining an annulus. A layer of foam is disposed in the annulus.

The present invention also provides a method of increasing the stiffness-to-mass ratio of a beam, wherein the beam defines a cavity. The method includes the steps of forming a tube which fits within the cavity defined by the beam; placing a layer of resin on at least a portion of the outer surface of the tube; and inserting the tube in the cavity, with the resin contacting the inner wall of the tube.

In still another aspect, the present invention comprises a C-rail section for use in truck frames. An inner stamped or rolled C-shaped member is separated from the outer C-frame rail by a layer of resin-based material.

In still another aspect, a plurality of plugs made of a foam which disintegrates at high temperatures are used to close through-holes in a part which is subsequently filled with a core material. The part is then passed through an oven which melts or disintegrates the plugs.

In still another aspect, the present invention provides a door beam or side impact beam for a motor vehicle door which provides increased compression resistance at minimal cost and weight. A local reinforcement is provided in the midspan of a steel shell. The local reinforcement includes a high-strength, thin steel stamping and a layer of thermally expandable foam. This allows the outer shell to be formed of relatively inexpensive mild steel. The foam is sandwiched between the outer shell and the thin steel stamping.

In one aspect, the outer steel shell and inner steel stamping having mating flanges that are welded together by spot welds.

In still another aspect, a reinforced bumper is provided for a motor vehicle. A local reinforcement provides a steel-foam-steel laminate high-strength structure.

BRIEF DESCRIPTION OF THE DRAWINGS

FIG. 3 is a plan view of the radiator support beam of FIG. 2.

FIG. 4 is a front elevational view of the radiator support beam of the radiator support beam of FIG. 2.

FIG. 5 is a fragmentary longitudinal cross section along lines 5—5 of FIG. 3.

FIG. 6 is a cross section along lines 6—6 of FIG. 3.

FIG. 7 is a plan view of another radiator support beam made in accordance with the present invention in another configuration.

FIG. 8 is a fragmentary longitudinal cross section taken along lines 8—8 of FIG. 7.

FIG. 9 is a cross section along lines 9—9 of FIG. 7.

DETAILED DESCRIPTION OF THE PREFERRED EMBODIMENTS

Figure 1:
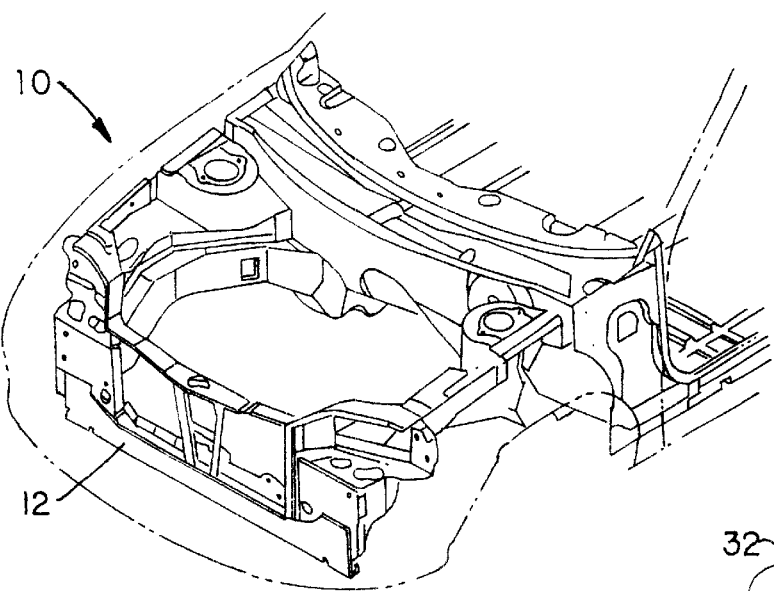
FIG. 1 is a perspective view of the front end of a motor vehicle, with the engine removed and the body shown in phantom.

Referring now to FIG. 1 of the drawings, a motor vehicle 10 is shown with the engine removed, and the body illustrated in phantom. Radiator support structure or beam 12 is mounted on the chassis and serves to support the vehicle radiator (not shown) In FIG. 2, radiator support beam 12 is illustrated in exploded view having outer shell or portion 14 which in this embodiment is a steel stamping. An inner tube, here shown as channel-shaped tube 16, is provided having a layer of resin-based material 18 applied to selected surfaces. Cap 20 is seen having a plurality of through-holes 22 and serves to enclose channel-shaped tube 16 within outer shell 14.

More specifically, and referring now of FIGS. 2 through 6 and 24, outer shell 14 defines a cavity or channel 24. A number of through-holes 26 are seen through which electric wiring (not shown) may extend. Outer shell 14 includes a laterally extending mounting bracket or plate portion 28 which is secured to components of the engine assembly.

Figure 2:
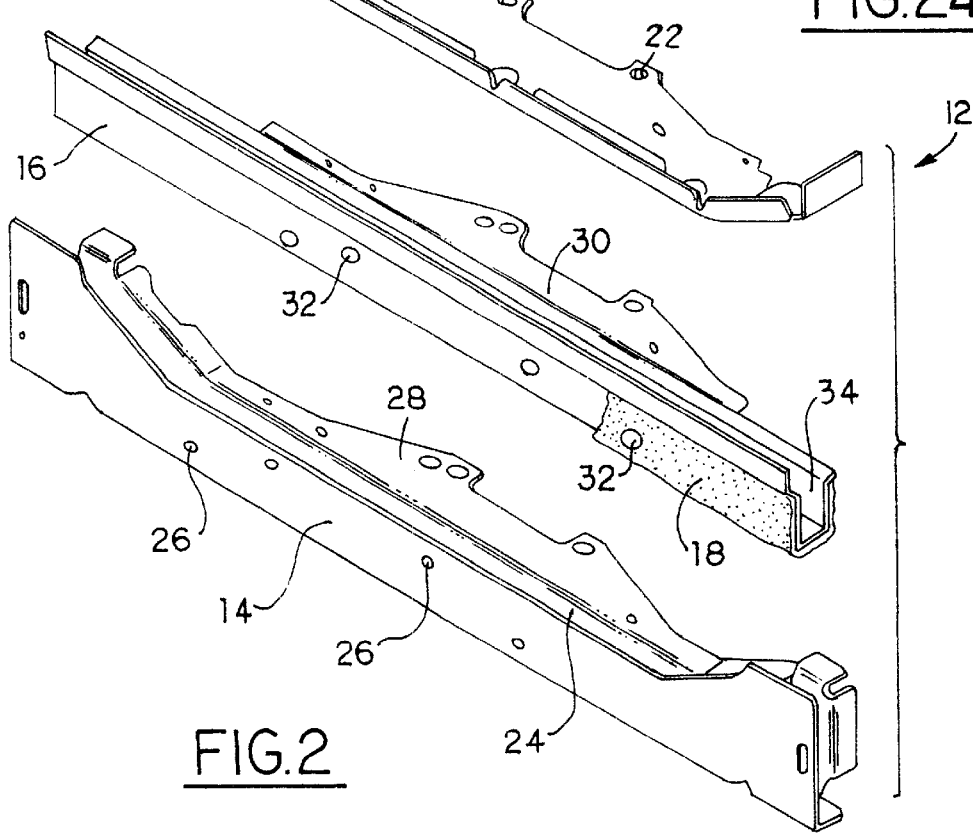
FIG. 2 is an exploded perspective view of a radiator support beam made in accordance with the present invention.

The benefits of the present invention are provided by inner tube or inner portion 16 which in this case is roll-formed metal, for example thin gauge steel, which is formed so that it may be closely fitted within cavity 24 of outer shell 14. Inner tube 16 in this embodiment closely conforms to the geometry of outer shell 14, including having a lateral plate 30 that mates with mounting bracket 28. By providing a layer of resin-based material 18 on selected surfaces of inner tube 16 and then assembling inner tube 16 and outer shell 14 to form the tube-in-tube construction shown best in the cross section of FIG. 6, the stiffness of beam 12 is increased significantly without a significant increase in mass. Accordingly, as shown in FIGS. 2 and 6, a layer of a resin-based material 18 is applied, shown here on three sides of inner tube 16.

A number of resin-based compositions can be utilized to form resin-based layer 18 in the present inventions. The preferred compositions impart excellent strength and stiffness characteristics to beam 12 while adding only marginally to the weight. With specific reference now to the composition of the resin-based layer, the density of the material should preferably be from about 15 pounds per cubic feet to about 40 pounds per cubic feet to minimize weight. The melting point of resin-based layer 18, heat distortion temperature, and the temperature at which chemical breakdown occurs must also be sufficiently high such that layer 18 substantially maintains its structure at high temperatures typically encountered in paint ovens and the like. Therefore, resin-based layer 18 should be able to withstand temperatures in excess of 300 degrees F. and preferably 350 degrees F. for short times. Also, the resin-based layer 18 should be able to withstand heats of about 180 degrees F. to 220 degrees F. for extended periods without exhibiting substantial heat induced distortion or degradation.

In more detail, resin-based layer 18 includes a synthetic resin, a cell-forming agent, and a filler. A synthetic resin comprises from about 35.0 percent to, about 95.0 percent by weight, preferably from about 75.0 percent to about 94.0 percent by weight, and most preferably from about 78.0 percent to about 90.0 percent by weight of layer 18. As used herein, the term "cell-forming agent" refers generally to agents which produce bubbles, pores, or cavities in layer 18. That is, resin-based layer 18 has a cellular structure, having numerous cells disposed throughout its mass. This cellular structure provides a low-density, high-strength material, which, in beam 12, provides a strong, yet lightweight structure. Cell-forming agents which are compatible with the present invention include reinforcing "hollow" microspheres or microbubbles which may be formed of either glass or plastic. Plastic microspheres may be either thermosetting or thermoplastic and either expanded or unexpanded. In one embodiment, unexpanded microspheres are used which are then expanded to form resin-based layer 18. The preferred microspheres are from about 1.0 to about 250 and preferably from about 10 to about 180 microns in diameter. The cell-forming agent may also comprise a larger, lightweight material such as macrospheres of greater than 400 microns in diameter. Also, the cell-forming agent may comprise a blowing agent which may be either a chemical blowing agent or a physical blowing agent. Glass microspheres are particularly preferred. Where the cell-forming agent comprises microspheres or macrospheres, it constitutes from about 1.0 percent to about 60.0 percent by weight, preferably from about 1.0 percent to about 35.0 percent by weight, and most preferably from about 3.0 percent to about 20.0 percent by weight of layer 18. Where the cell-forming agent comprises a blowing agent, it constitutes from about 1.0 percent to about 10.0 percent by weight, preferably from about 1.0 percent to about 5.0 percent by weight, and most preferably from about 3.0 percent to about 5.0 percent by weight of layer 18. Suitable fillers include glass or plastic microspheres, silica flume, calcium carbonate, milled glass fiber, and chopped glass strand. Glass microspheres are particularly preferred. Other materials may be suitable. A filler comprises from about 1.0 percent to about 55.0 percent by weight, preferably from about 5.0 percent to about 24.0 percent by weight, and most preferably from about 7.0 percent to about 19.0 percent by weight of resin based layer 18.

Preferred synthetic resins for use in the present invention include thermosets such as epoxy resins, vinyl ester resins, thermoset polyester resins, and urethane resins. It is not intended that the scope of the present invention be limited by molecular weight of the resin. Where the resin component of the liquid filler material is a thermoset resin, various accelerators, such as "EMI-24" (imidazole accelerator) and "DMP30", and curing agents, preferably organic peroxides such as "MEK", peroxide and "Percadox", may also be included to enhance the cure rate. A functional amount of accelerator is typically from about 0.1 percent to about 4.0 percent of the resin weight with, corresponding reduction in one of the three components, resin, cell-forming agent, or filler. Similarly, the amount of curing agent used is typically from about 12 percent to about 4 percent of the resin weight with a corresponding reduction in one of the three components, resin, cell-forming agent, or filler. Effective amounts of processing aids, stabilizers, colorants, UV absorbers and the like may also be included in layer. Thermoplastics may also be suitable.

In the following tables, preferred formulations for resin-based layer 18 are set forth. It has been found that these formulations provide a layer 18 which results in a beam 12 having a stiffness-to-mass ratio of greater than 1, where 1 is a normalized stiffness-to-mass ratio of a hollow or open C-channel metal beam regardless of mass.

Formulas I and III are preferred for use with clean metal, surfaces (i.e., after removing any residue on the contacting metal surfaces such as mill oils and drying compounds). Formula II does not require extensive precleaning of the metal.

| INGREDIENT | PERCENTAGE BY WEIGHT | INGREDIENT | PERCENTAGE BY WEIGHT |
| --- | --- | --- | --- |
| FORMULA I | | FORMULA II | |
| Polyester Resin ("ARS-137-69") | 80.9 | EPON 828 | 54.5 |
| | | Haloxy 62 | 7.5 |
| "Percadox 16N" | 1.1 | Der 732 | 6.1 |
| "3M C15" | 18 | Expancel 551DU | 2.0 |
| | | SG Micros | 8.8 |
| | | 3M K20 | 17.7 |
| | | DI-CY | 3.4 |
| FORMULA III | | | |
| Polyester Resin ("ARISTECH 13031") | 48.8 | | |
| "Percadox 16N" | 0.7 | | |
| "SG Micros" (PA IND) | 50.5 | | |

As will be appreciated by those skilled in the art, EPON 828 is an epoxy resin, Haloxy 62 is an epoxy diluent, Der 732 is a flexible epoxy, Expancel 551 DU is a blowing agent, SG Micron and 3M K20 are microsphere, and DI-CY is a curing agent.

A number of methods of applying layer 18 to reinforcement tube 16 may be suitable, for example by spraying the resin-based material onto the surface of tube 16. It may be suitable to fill the space between the inner and outer tubes after they are assembled. Most preferred is the application of the resin-based material using a duck-bill applicator which applies a wide, even ribbon of resin on the surfaces of tube 16. In most applications, the thickness (inches) of layer 18 should be from about 0.060 to about 0.50 and more preferably from about 0.10 to about 0.25, where the preferred foam compositions described herein are utilized.

Figure 24:
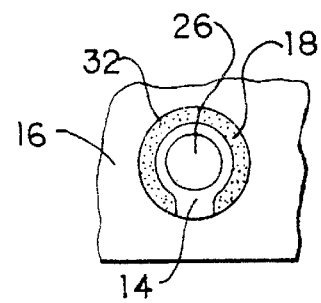
FIG. 24 is a fragmental view of the oversized through-holes of the present invention shown in FIG. 2.

In those embodiments of the present invention in which outer shell 14 has one or more through-holes 26, for example, for the passage of electrical wiring or the like, it will be necessary to provide matching through-holes 32 in inner tube 16 in register with the through-holes 26 of the outer shell. Since structural foam layer 18 could in some instances block all or a portion of through-holes 32, requiring a separate assembly step of clearing the foam material from the hole, In a preferred embodiment of this invention, clearance is obtained by creating oversized through-holes 32 in alignment with through-holes 26. It is preferred that the diameter of through-holes 32 be at least 20 percent larger than that of through-holes 26 but in some applications equal size through-holes will be sufficient. In this manner, resin or foam which extends from the edges of inner tube 16 into the clearance of through-holes 32 will generally not block wire, clips, or screws and the like that are threaded, through through-holes 26. This concept is also illustrated in FIG. 24 (as viewed looking through hole 32 from the inside) in which a portion of layer 18 extends into the clearance of through-hole 32 during application, but not to the margins of through-hole 26. In the event that layer 18 does obstruct any of the through-holes 32, it may be blown clear using an air jet before layer 18 solidifies.

Referring again to FIGS. 2 and 5, cap 20 closes radiator support beam 12 as well as cavity or channel 34 defined by inner tube 16. Cavity 34 will generally be clear (.i.e., inner tube 16 will be hollow) other than for the presence of wiring. Cap 20 is preferably welded in place. The effective thickness of the reinforced walls of beam 12 is typically four to five times that of shell 14, with very little increase in weight.

Where layer 18 is a thermoset and/or expandable resin-based material, layer 18 may be cured and/or expanded in place from the heat of the B-coat oven. It is preferred that layer 18 bond together shell 14 and tube 16. It should also be noted that the construction of the present invention allows the B-coat to drain, which would not be possible if the entire beam were foam-filled. In addition, the minimal amount of foam which is used does not create a heat sink body as is the case with large, dense foam areas and the minimal amount of foam usage reduces materials cost. Also, the need for plugs or the like to allow foam filling of the entire beam is eliminated.

In another embodiment of the present invention, and referring now to FIGS. 7, 8, and 9, inner tube 16' is shown which has a rectangular shape and is in the nature of a closed rectangular tube (i.e., closed along its length). As with channel-shaped inner tube 16 rectangular inner tube 16, will generally be hollow. Layer. 18' is shown applied to three sides of inner tube 16'. In general, at least about 25 percent and more preferably at least about 75 percent of the mating area which forms the tube-in-tube region of the beam should be covered by layer 18.

Where desired, inner tube 16' at through-holes 32' may be flanged inwardly toward outer shell 14' such that the flange serves as a closure to confine and isolate layer 18'. Alternatively, outer shell 14' at through-holes 26' may be flanged inwardly toward inner tube 16' for the same purpose. Also, plugs or grommets in through-holes 26' and/or 32' can be used for this purpose.

A number of materials can be used to form the outer shell and inner tube such as plastic or metal, but steel is preferred. The outer shell metal gauge (inches) will typically be from about 0.030 to about 0.090. The inner tube metal gauge will typically be from about 0.025 to about 0.050.

A number of additional specific applications of the present invention will be apparent in light of the teachings herein. A few of the preferred applications are set forth hereinafter.

Figure 10:
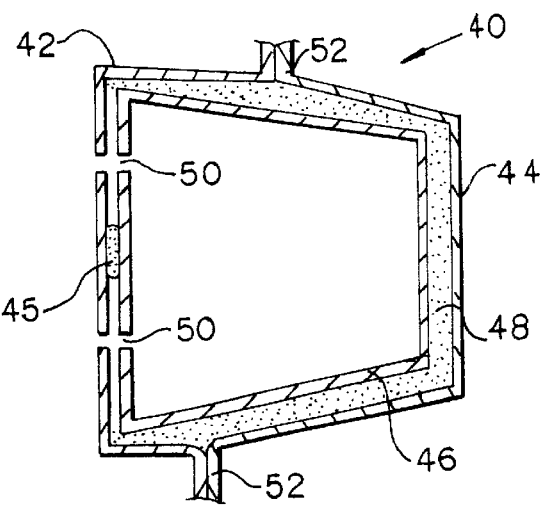
FIG. 10 is a cross section of a rocker panel made in accordance with the present invention.

Referring now to FIG. 10 of the drawings, metal automotive rocker panel assembly 40 is shown having metal rocker inner panel 42 and metal rocker outer panel 44. Inner tube 46 is provided along with a layer of resin-based material 48 disposed thereon which separates inner tube 46 from the rocker panels 42 and 44. An adhesive bead 45, which may be made of the same material as layer 48, is provided adjacent trim holes 50. The assembly is welded at flanges 52.

Figure 11:
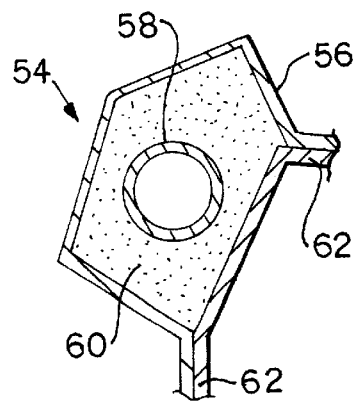
FIG. 11 is a cross section of a windshield pillar made in accordance with the present invention.

In FIG. 11, the present invention is shown in use as a windshield pillar 54. Again, the tube-in-tube construction is employed with windshield pillar outer 56 being separated from windshield pillar inner tube 58 by resin-based layer 60. The assembly is welded together at flanges 62.

Figure 12:
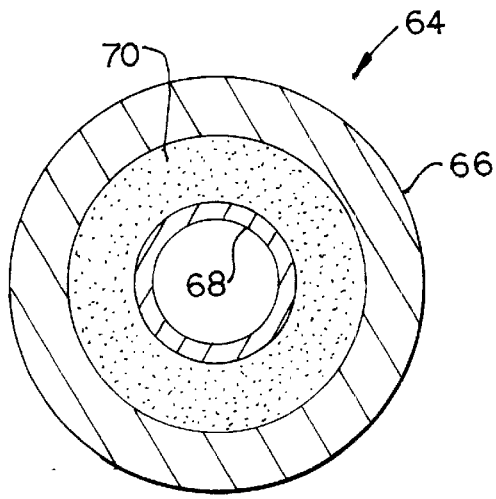
FIG. 12 is a cross section of a drive shaft made in accordance with the present invention.

In FIG. 12, a cross section of automotive driveshaft 64 is shown having an outer metal tube 66 separated from an inner metal tube 68 by a layer of structural foam 70.

Figure 13:
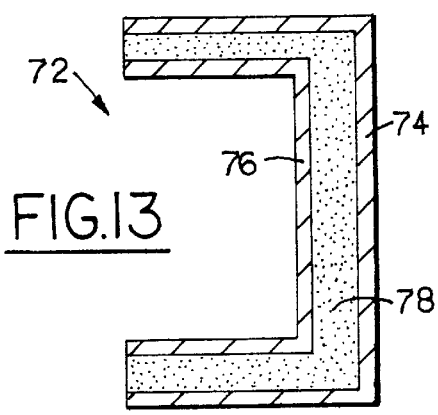
FIG. 13 is a cross section of a C-rail section made in accordance with the present invention.

In FIG. 13, C-rail 72 is shown having outer wall section 74 separated from inner tube or channel portion 76 by a layer of structural foam 78.

Figure 14:
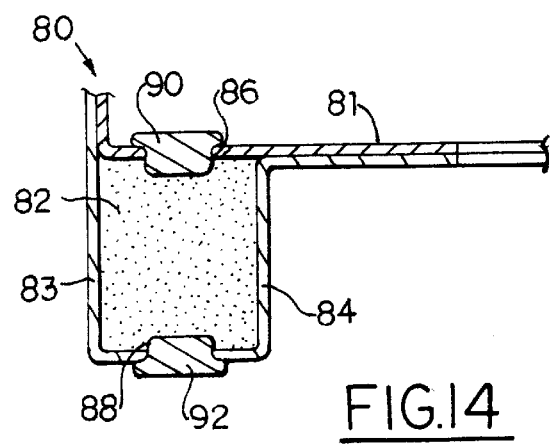
FIG. 14 is a cross section of a radiator support beam made according to another aspect of the present invention.

In still another embodiment, and referring now to FIG. 14 of the drawings, the entire cavity of a structural member such as radiator support beam 80 having cap 81 and shell 83 is filled with a cementitious material or a structural foam 82. In order to prevent material 82 from flowing out of cavity 84 through through-holes 86 and 88, plugs 90 and 92 are provided, preferably formed of a foam material such as Styrofoam® (expanded polystyrene) which will disintegrate at temperatures present in automotive treatment ovens. The plugs are preferably inserted into all through-holes except those through which material 82 is injected. In this manner, plugs 88 and 90 are automatically "removed" so that sufficient clearance is maintained for wiring clips and the like. The preferred material for use in forming. material 82 is described in U.S. Pat. No. 5,124,186, "Composite Tubular Door Beam Reinforced with a Reacted Core Localized at the Mid-Span of the Tube", dated Jun. 23, 1992, the entire disclosure of which is incorporated by reference. Most preferably, the material described beginning at line 41 of column 10 of the aforementioned U.S. Pat. No. 5,124,186 is preferred.

Figure 15:
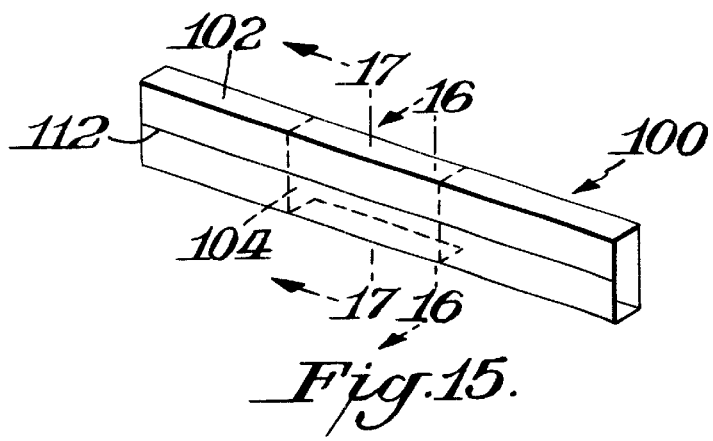
FIG. 15 is a perspective view of a reinforced door beam in accordance with the present invention.
Figure 16:
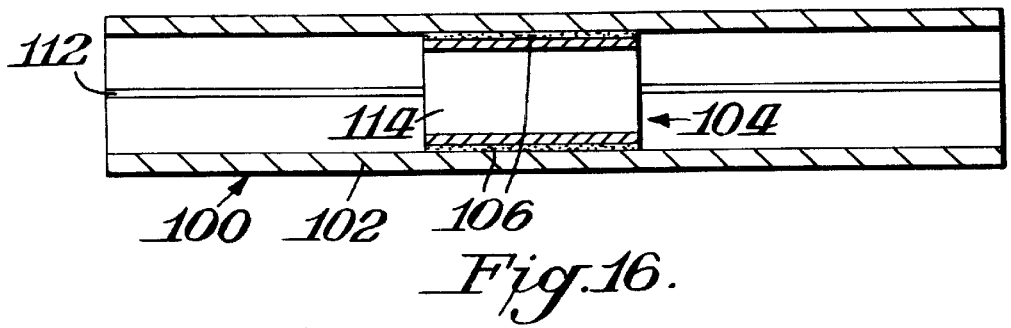
FIG. 16 is a section along lines 16—16 of FIG. 15.

In still another embodiment, and referring now to FIGS. 15 and 16 of the drawings, a reinforced door beam or side impact beam 100 is seen having an outer structural shell 102 which is preferably formed of mild steel (preferably a yield strength of 25,000–35,000 psi) or non-heat treated high-strength steel having a nominal thickness of from about 0.050 inch to about 0.100 inches. Structural shell 102 is reinforced locally in accordance with the present invention to provide compression face reinforcement element 104 (shown in phantom in FIG. 15). In the most preferred embodiment, reinforcement 104 occupies less than about the center one-third of structural shell 102 but preferably more than one-eighth of the length of structural shell 102.

Figure 17:
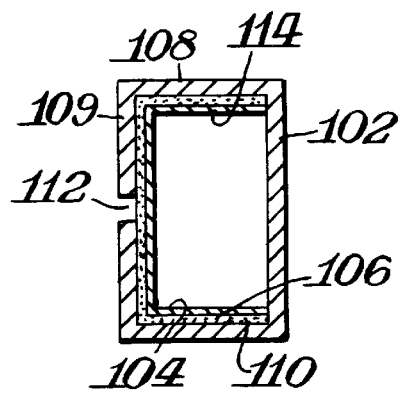
FIG. 17 is a section along lines 17—17 of FIG. 15.

Referring now also to FIG. 17 of the drawings, reinforcement 104 is shown in one embodiment as a three-sided reinforcement with a layer of structural foam 106 disposed along three inner surfaces 108, 109, and 110 of structural shell 102. In the illustrated embodiment of FIGS. 15, 16 and 17, foam layer 106 is shown spanning longitudinal gap 112 of structural shell 102, although this orientation is not required. Foam layer 106 is preferably from about 0.050 to about 0.25 inches thick. Disposed on inner surfaces 108, 109 and 110 of foam layer 106 is inner shell 114 Which is preferably formed of thin ultra high-strength steel, preferably having a nominal thickness of from about 0.025 to about 0.080 inches. Inner shell 114 is co-extensive with foam layer 106. That is, inner shell 114 has a size and geometry which matches foam layer 106.

In one mode of fabrication, reinforced door beam 100 is fabricated by extruding a ribbon or sheet of unexpanded resin-based material which is then applied to the surface of inner shell 114 (preformed to the desired geometry). Inner shell 114 would thus serve the function of a carrier member for the unexpanded material that forms foam layer 106. Inner shell 114 with the attached resin can then be inserted into one end of structural shell 102 and enough pressure applied to bond the resin in place, i.e., to hold the unexpanded material that forms foam layer 106 and its attached inner shell 114 in place in the mid portion of outer shell 102. In addition, it may be desirable to add dimples (not shown) in outer shell 102 to hold inner shell 114 and its resin layer in place.

Reinforced door beam 100 is attached inside a door cavity in any number of configurations such as that shown in U.S.

Pat. No. 4,978,562 mentioned above, the entire disclosure of which is incorporated herein by reference. The precise attachment means such as end pieces and/or welding is not a critical part of the present invention. Once installed in the vehicle door, reinforced door beam 100 is heated to a temperature sufficient to thermally expand or "foam" layer 106, such as when the motor vehicle is placed in a paint oven or the like. At the blowing agent activation temperature, the resin that forms layer 106 expands to its final form and solidifies to form a strong bond between inner shell 114 and outer shell 102. Since layer 106 is a structural foam and inner shell 114 is a thin high-strength steel, structural shell 102 is reinforced with a minimum weight increase.

Figure 18:
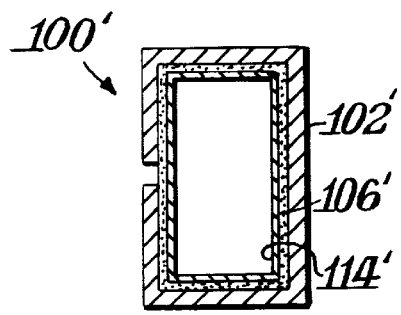
FIG. 18 is a cross section of a reinforced door beam in another configuration.

In FIG. 18 of the drawings, reinforced door beam 100' is shown having outer structural shell 102', foam layer 108' and inner shell 118'. In this embodiment, foam layer 108' (and inner shell 114') are four-sided in contrast to the three-sided embodiment described in the previous embodiment. In both the three-sided embodiment and the four-sided embodiment, the material used to form the thermally expandable foam layer is that which was previously described in connection with the previous embodiments.

Figure 19:
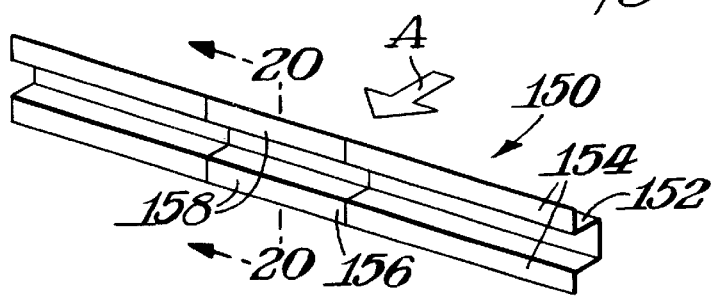
FIG. 19 is a perspective view of a reinforced door beam in accordance with the present invention.

In another embodiment as shown in FIG. 19, reinforced door beam or side impact beam 150 is provided with outer shell 152, again a mild to medium strength steel having a thickness of 0.050 to 0.100 inch, which includes wide flanges 154 on one side thereof. Flanges 154 will typically have a width of from about 0.43 to about 0.75 inches. Centrally disposed inner shell 156 has matching flanges 158 and is formed of thin high-strength steel (nominal thickness of from about 0.025 to about 0.080 inches). Inner shell 156 occupies only about one-third of the length of outer shell 152.

Figure 21:
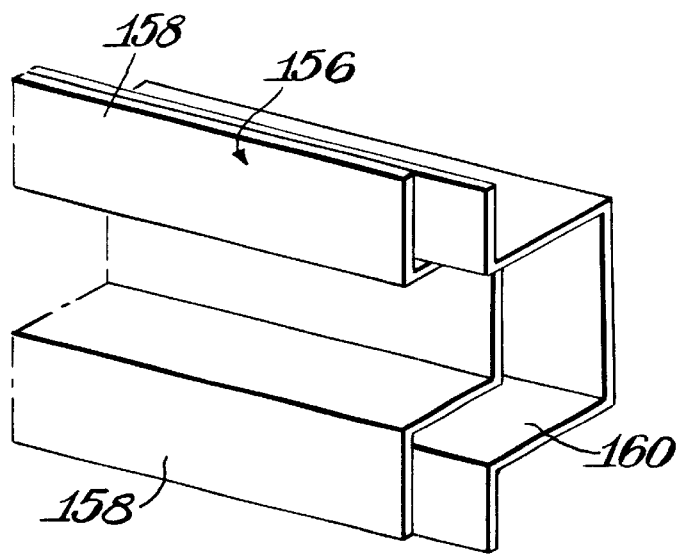
FIG. 21 is a fragmentary perspective view of one end of the beam shown in FIG. 19.
Figure 20:
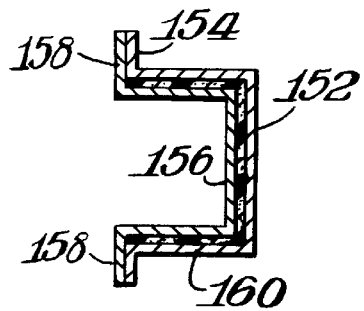
FIG. 20 is a section along lines 20—20 of FIG. 19.

As best seen in FIGS. 20 and 21, inner shell 156 is separated from outer shell 152 by a layer 160 of thermally expanded resin-based material. As expanded, layer 160 has a preferred thickness of from about 0.060 to about 0.25 inches. In this embodiment, structural foam layer 160 does not reside between flanges 154 and flanges 158. Instead, flanges 154 and flanges 158 are spot-welded together. Thus, the invention provides localized reinforcement to force in the direction of arrow "A" at minimal additional cost and weight.

Figure 22:
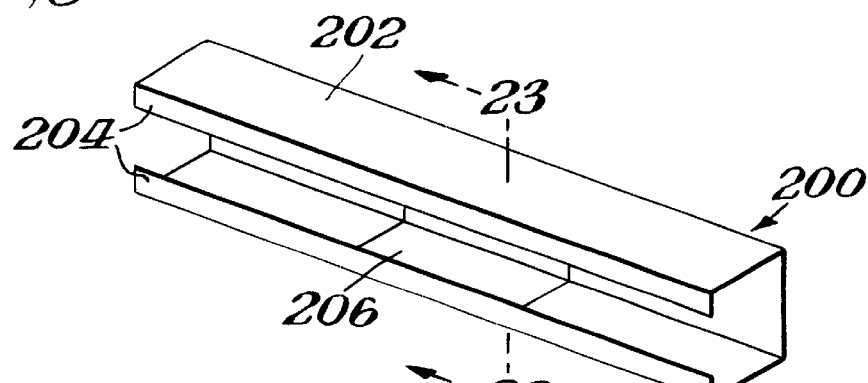
FIG. 22 is a perspective view of a reinforced bumper made in accordance with the present invention.
Figure 23:
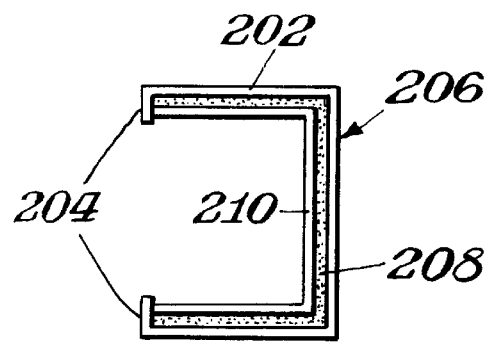
FIG. 23 is a cross-section along lines 23—23 of FIG. 22.

Referring now to FIG. 22 and FIG. 23 of the drawings, in one embodiment the present invention provides a reinforced bumper 200 for a motor vehicle. The design of bumper 200 is similar to that of door beam 100 (of FIG. 15) in some respects. Accordingly, outer bumper shell 202 is provided which is in the nature of a C-section having flange portions 204. Located in the midspan of shell 202 preferably the central one-third portion (and preferably at least more than about the middle one-eighth of said shell 202), reinforcement 206 is shown having a layer of structural foam 208 disposed between the inner surface of bumper shell 202 and thin, ultra high-strength inner shell 210. Bumper shell 202 will typically be formed of steel (mild steel or non-heat treated high-strength steel) having a thickness of from about 0.050 to 0.080 inches. Foam layer 208 will be one of the preferred resin-based thermally expanded materials previously described and will have a thickness of from about 0.060 to about 0.25 inches. Inner shell 210 will have a thickness of from about 0.030 to about 0.080 inches and will be made from high-strength steel.

As with the reinforced door beam previously described, the thermally expandable resin layer may be extruded, cut to length, and placed on inner shell 210 as a carrier. It may then be inserted in place in bumper shell 202. Preferably after assembly of the vehicle, the resin is thermally expanded to form a lightweight foam layer having a high-strength inner shell.

It will be appreciated, then, that the side impact beams and bumpers shown in FIGS. 15–23 derive unexpected cost savings and quality by (1) using mild steel or non-heat treated steel as the outer shell (which has the greatest mass); and only a small amount of high-strength steel as the localized inner shell and (2) by minimizing the amount of resin which is used. It will be understood that the mild strength steel holds its geometric shape after forming (does not exhibit spring back) much better than heat treated steel.

As is apparent from the foregoing description, the tube may be considered a backdrop carrier for the foam. The combination of carrier and foam may be considered as a drop in insert for reinforcing a non-planar structural member where the expanded structural foam contacts and intimately bonds to different surfaces of the structural member which are not coplanar with each other. A distinct advantage of the invention is that it does not require precise location of the insert against the structural member since, upon activation the foam will expand into contact with the necessary surfaces of the structural member. simply by being generally disposed toward those surfaces. This advantage lends the invention to use in industrial assembly lines without requiring highly skilled workers to place the insert in the proper location. Where the foam is heat expandable, the invention is particularly useful in the automotive industry which employs such assembly lines and which employs various downstream heating stations, such as in a B-coat oven: Accordingly, the insert could be conveniently dropped in generally the correct location and the foam will automatically expand when the structural member is later subjected to one of the conventional heating steps generally used in vehicle manufacturing.

Where the reference is made to the reinforcement of a structural member having at least two non-coplanar surfaces, such member may have various shapes. Examples of such shapes are U-shape or channel shape, closed circular or oval shape, square or rectangular or triangular or other geometric shapes, and V or C or J or M or W shapes.

While the invention has been described primarily in connection with automotive or vehicle parts, it is to be understood that the invention may be practiced as part of other products, such as aircrafts, ships, bicycles, toys, exercise devices or virtually anything that requires energy for movement. Similarly, the invention may be used with stationary or static structures, such as buildings, walls, floors or ceilings to provide a rigid support when subjected to vibration such as from an earthquake or simply to provide a lightweight support for structures subjected to loads. Additionally, while the invention has been described primarily with respect to heat expandable foams and with respect to metal parts such as the inner tubes or carriers 16, 58 and 76, other materials can be used. For example, the foam could be any suitable known expandable foam which is chemically activated into expansion and forms a rigid structural foam. The support member, such as the inner tube, could be made of materials other than metal such as various plastics or polymeric materials or various wood type fibrous materials having sufficient rigidity to function as a back drop or support for the foam. Where a heat expandable foam is used the support or backdrop should be able to withstand the heat encountered during the heat curing. Where other types of foam materials are used, however, it is not necessary that the support member be able to withstand high temperatures.

Instead, the basic requirement for the support member is that it have sufficient rigidity to function in its intended manner. It is also possible, for example, to use as the support member materials which in themselves become rigid upon curing or further treatment. The invention may also be practiced where the outer member or beam or other structural member is made of materials other than metal. It is preferred, however, that materials be selected for the substrate and backdrop or carrier, as well as the foam, so that the thin unexpanded foam upon expansion forms a strong bond with the substrate and backdrop so that a structural composition will result. Further, the invention may be practiced where, instead of a beam as described, other constructions with the support or backdrop may also be used.

In a broad sense, the invention in one aspect may be considered as providing the expandable foam with a support or backdrop or carrier in the form of a tube, foil or other form including a solid or rigid foam. Where a solid or rigid foam is used as the support or backdrop or carrier, the foam support is preshaped in sheets and expanded either by heat or chemically with the specific practice of the invention representing a balance between performance and weight tradeoff.

What is claimed is:

1. A reinforced vehicle bumper comprising an elongated outer bumper shell having a central elongated wall, said outer bumper shell being located at an end of the vehicle, a pair of side walls extending outwardly from said central wall, said side walls being generally parallel to each other to define an open space between said central wall and said side walls, an inner member mounted in said open space, said inner member having a central portion spaced from said central wall and spaced from said side walls of said outer shell, said central portion of said inner member having wall portions extending outwardly from said central portion and terminating in end edges, said end edges being disposed against and being in contact with said side walls to create a peripherally continuous closed chamber through the cross section of said outer shell and said inner member, said closed chamber being around said central portion and said wall portions of said inner member, said closed chamber extending between said inner member and said shell from one of said side walls to other of said side walls and across said central wall, an expandable structural foam disposed in said closed chamber, and said structural foam upon expansion filling said closed chamber and being intimately bonded to said outer shell and said inner member.

2. The bumper of claim 1 wherein said side walls of said outer shell terminate in flange portions extending in line with and toward each other, and said inner member end edges being disposed against said flange portions.

3. The bumper of claim 1 wherein said outer shell and said inner member are made of metal.

4. The bumper of claim 1 wherein said outer shell and said inner member are made of high-strength steel.

5. The bumper of claim 1 wherein said continuous closed chamber is generally U-shaped.

6. The bumper of claim 1 wherein said bumper is located at the front end of said vehicle.

* * * * *